(12) United States Patent
Aoyagi et al.

(10) Patent No.: US 9,641,668 B2
(45) Date of Patent: May 2, 2017

(54) MOBILE STATION

(71) Applicant: NTT DOCOMO, INC., Tokyo (JP)

(72) Inventors: Kenichiro Aoyagi, Tokyo (JP); Wuri Andarmawanti Hapsari, Tokyo (JP); Itsuma Tanaka, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/761,395

(22) PCT Filed: Dec. 25, 2013

(86) PCT No.: PCT/JP2013/084611
§ 371 (c)(1),
(2) Date: Jul. 16, 2015

(87) PCT Pub. No.: WO2014/112302
PCT Pub. Date: Jul. 24, 2014

(65) Prior Publication Data
US 2015/0365516 A1     Dec. 17, 2015

(30) Foreign Application Priority Data

Jan. 18, 2013   (JP) .................................. 2013-007461

(51) Int. Cl.
*H04M 1/725*   (2006.01)
*H04W 48/06*   (2009.01)

(52) U.S. Cl.
CPC .... *H04M 1/72577* (2013.01); *H04M 1/72519* (2013.01); *H04M 1/72522* (2013.01); *H04W 48/06* (2013.01)

(58) Field of Classification Search
CPC ......... H04M 1/72577; H04M 1/72522; H04M 1/72519; H04W 24/02
See application file for complete search history.

(56) References Cited

U.S. PATENT DOCUMENTS

| 6,185,413 B1* | 2/2001 | Mueller | ............ H04M 15/8044 455/405 |
| 2012/0178496 A1* | 7/2012 | Hwang | ............ H04W 52/0264 455/550.1 |

(Continued)

FOREIGN PATENT DOCUMENTS

| CN | 102291322 A | 12/2011 |
| JP | 2006-186686 A | 7/2006 |

(Continued)

OTHER PUBLICATIONS

International Search Report issued in corresponding PCT Application No. PCT/JP2013/084611 mailed Jan. 28, 2014(2 pages).

(Continued)

*Primary Examiner* — Leon-Viet Nguyen
(74) *Attorney, Agent, or Firm* — Osha Liang LLP

(57) ABSTRACT

A user is easily informed of applications to be restricted easily when restriction processing on per application basis is being carried out. A mobile station according to the present invention includes: a storage unit configured to store one or more applications executable on the mobile station; a display unit configured to display an icon for each application on a display; and a determination unit configured to determine an application to be restricted based on SSAC information or ACDC information. The display unit is configured to use different display methods between the icon for the application to be restricted and the icon for the application other than the application to be restricted.

6 Claims, 2 Drawing Sheets

(56) References Cited

U.S. PATENT DOCUMENTS

| | | | | |
|---|---|---|---|---|
| 2013/0210406 A1* | 8/2013 | Vidal | ............... | H04W 4/00 |
| | | | | 455/418 |
| 2015/0223144 A1* | 8/2015 | Lee | ............... | H04W 48/02 |
| | | | | 370/259 |

FOREIGN PATENT DOCUMENTS

| | | |
|---|---|---|
| JP | 2010-232811 A | 10/2010 |
| JP | 2012-147433 A | 8/2012 |
| WO | 2006/025390 A1 | 3/2006 |

OTHER PUBLICATIONS

3GPP TS 36.331 V10.8..0; "3rd Generation Partnership Project; Technical Specification Group Radio Access Network; Evolved Universal Terrestrial Radio Access (E-UTRA); Radio Resource Control (RRC); Protocol specification (Release 10)"; Dec. 2012 (305 pages).

3GPP TS 24.173 V11.4.0; "3rd Generation Partnership Project; Technical Specification Group Core Network and Terminals; IMS multimedia telephony communication service and supplementary services; Stage 3 (Release 11)"; Dec. 2012 (17 pages).

Office Action issued Feb. 28, 2017, in corresponding Chinese Patent Application No. 201380070750.X (15 pages).

* cited by examiner

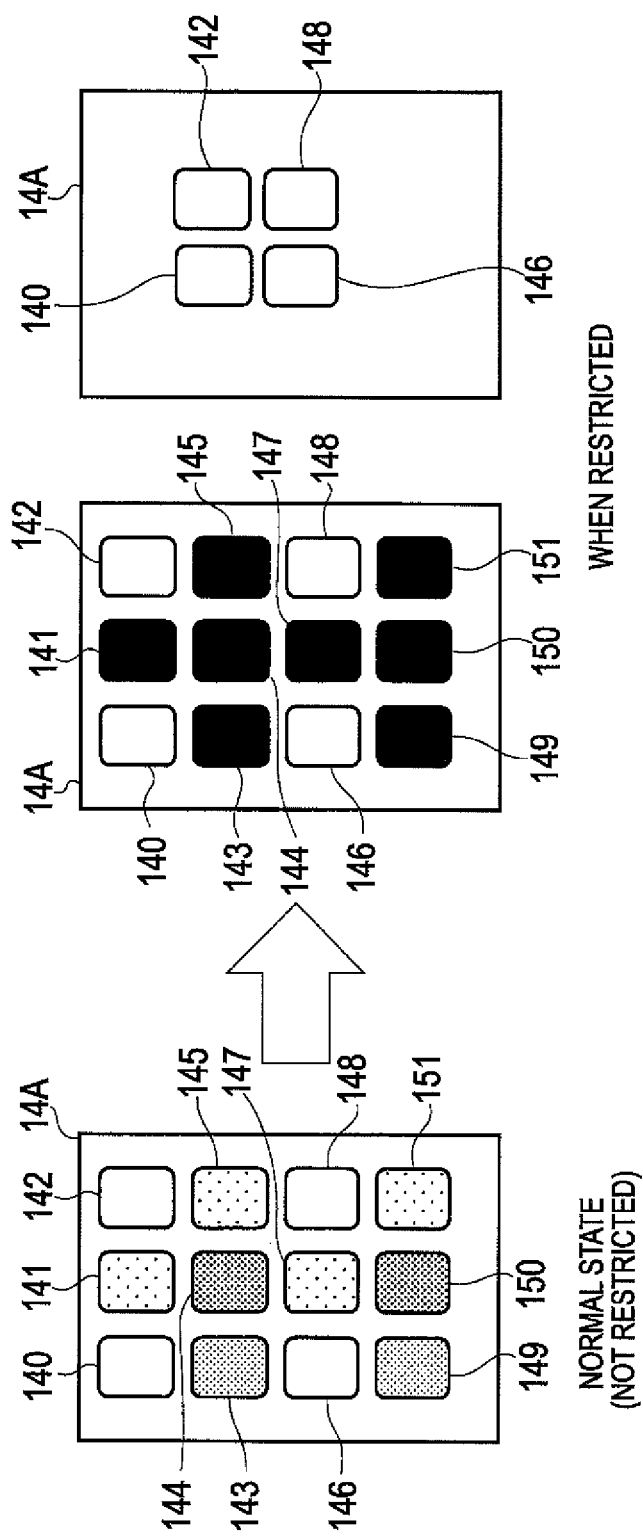

MOBILE STATION

TECHNICAL FIELD

The present invention relates to a mobile station.

BACKGROUND ART

In a mobile station UE called a "smartphone" that has been widely used lately, for example, a user can freely install various applications, and can cause icons for these applications to be displayed on a display so as to use these applications quickly.

Meanwhile, restriction processing for avoiding or reducing network congestion has been conceived such as "SSAC (Service Specific Access Class)" to restrict voice services, and "ACDC (Application specific Congestion control for Data Communication)" which is flexible restriction processing on per application basis in order to prevent critical applications such as voice communications from being restricted together with applications such as data communications.

PRIOR ART DOCUMENT

Non-Patent Document

Non-patent document 1: 3GPP TS36.331
Non-patent document 2: 3GPP TS24.173

SUMMARY OF THE INVENTION

However, the user cannot know which application is to be restricted even when restriction processing on per application basis is being carried out. Thus, there has been a problem that the user cannot easily recognize which application is to be restricted, specifically the user can recognize that an application is restricted only after trying to use the application.

Thus, the present invention has been made in view of the above-mentioned problem, and an objective thereof is to provide a mobile station capable of easily informing the user of applications to be restricted when restriction processing on per application basis is carried out.

A first feature of the present invention is summarized as a mobile station including: a storage unit configured to store an application executable on the mobile station; a display unit configured to display an icon for the application on a display; and a determination unit configured to determine an application to be restricted based on restriction information. Here, the display unit is configured to change a display method of displaying the icon for the application executable on the mobile station on the display based on a result of the determination on the application to be restricted.

BRIEF DESCRIPTION OF THE DRAWINGS

FIGS. 3 (a) to (c) are diagrams showing an example of a display screen of the mobile station according to the first embodiment of the present invention.

MODE FOR CARRYING OUT THE INVENTION

Mobile Communication System According to First Embodiment of Present Invention A mobile communication system according to a first embodiment of the present invention will be described with reference to FIGS. 1 to 4. This embodiment will be described by taking a mobile communication system of an LTE scheme as an example of the mobile communication system according to this embodiment. However, the present invention is applicable to mobile communication systems other than that of an LIE scheme.

Figure 1:
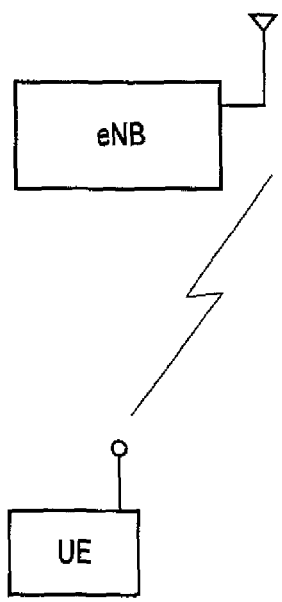
FIG. 1 is an overall configuration diagram of a mobile communication system according to a first embodiment of the present invention.

As shown in FIG. 1, the mobile communication system according to this embodiment includes a radio base station eNB and a mobile station UE.

Here, in the mobile communication system according to this embodiment, the radio base station eNB is configured to be capable of sending the mobile station UE SSAC information which is restriction information for carrying out SSAC and ACDC information which is restriction information for carrying out ACDC.

For example, SSAC information is restriction information for carrying out restriction processing on per MS (IP Multimedia Subsystem)-level service basis. Note that such an IMS-level service is assumed to be an IMS-Voice (e.g., VoLTE: Voice over LTE) service, an IMS-Video (e.g., a TV telephone) service, or the like.

Figure 2:
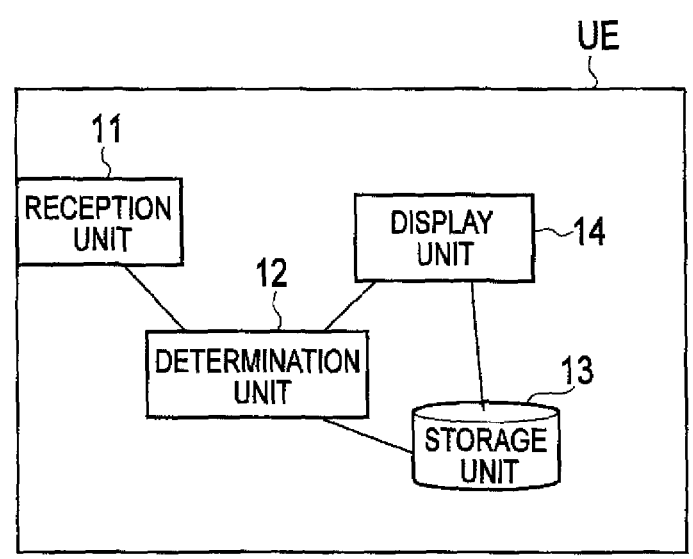
FIG. 2 is a functional block diagram of a mobile station according to the first embodiment of the present invention.

The mobile station UE according to this embodiment is a mobile station UE called a "smartphone," for example. As shown in FIG. 2, the mobile station UE includes a reception unit 11, a determination unit 12, a storage unit 13, and a display unit 14.

The reception unit 11 is configured to receive various signals from the radio base station eNB. For example, the reception unit 11 is configured to receive restriction information such as SSAC information and ACDC information from the radio base station eNB. Such various signals may be sent via broadcast information, or may be sent via dedicated control signals.

The determination unit 12 is configured to determine an application to be restricted based on restriction information such as SSAC information or ACDC information.

For example, the determination unit 12 may be configured to determine, when the reception unit 11 receives SSAC information, that an application which handles a service (e.g., an IMS-Voice (VoLTE) service) restricted according to the SSAC information sent via broadcast information (e.g., an application for calls) is an application to be restricted and that other services (e.g., an application for mails and an application for disaster message board) are applications other than applications to be restricted.

Alternatively, the determination unit 12 may be configured to determine, when the reception unit 11 receives ACDC information, that an application which is rated as the rank of applications restricted according to the ACDC information (e.g., Skype) is an application to be restricted and that other services (e.g., an application for VoLTE service) are applications other than applications to be restricted.

The storage unit 13 is configured to store applications executable on the mobile station UE. To be more specific, the storage unit 13 is configured to store applications installed in the mobile station UE.

In addition, the storage unit 13 may be configured to store an application already set in the mobile station UE but not yet installed in the mobile station UE.

Further, the storage unit 13 may be configured to store, if any, an application which can replace each application.

As shown in FIG. 3(*a*), the display unit 14 is configured to display, on a display 14A, icons 140 to 151 for applications executable on the mobile station UE.

Here, the display unit 14 may be configured to decide applications, whose corresponding icons 140 to 151 should be displayed on the display 14A, according to the setting made by a user. To be more specific, the display unit 14 may be configured to display, on the display 14A, only the icons 140 to 151 for applications set by the user.

In addition, as shown in FIGS. 3(*b*) and 3(*c*), the display unit 14 is configured to use different display methods between icons 141, 143 to 145, 147, and 149 to 151 for applications to be restricted and icons 140, 142, 146, and 148 for applications other than the applications to be restricted.

Here, the display unit 14 may be configured to change at least one of the color, size, shape, icon display mode, and display location of each of the icons 141, 143 to 145, 147, and 149 to 151 for the applications to be restricted.

Incidentally, the display mode includes motions such as the blinking, rotation, and fadeout of an icon.

For example, as shown in FIG. 3(*b*), the display unit 14 may be configured to change the color of each of the icons 141, 143 to 145, 147, and 149 to 151 for the applications to be restricted to "black."

In addition, as shown in FIG. 3(*c*), the display unit 14 may be configured not to display the icons 141, 143 to 145, 147, and 149 to 151 for the applications to be restricted.

Further, the display unit 14 may be configured to make the size of each of the icons 141, 143 to 145, 147, and 149 to 151 for the applications to be restricted smaller than the icons 140, 142, 146, and 148 for the applications other than the applications to be restricted.

Furthermore, the display unit 14 may be configured to change the display location of each of the icons 141, 143 to 145, 147, and 149 to 151 for the applications to be restricted to a location below (or above) the display location of each of the icons 140, 142, 146, and 148 for the applications other than the applications to be restricted.

Alternatively, the display unit 14 may be configured to change at least one of the color, size, and display location of each of the icons 140, 142, 146, and 148 for the applications other than the applications to be restricted.

For example, the display unit 14 may be configured to change the color of each of the icons 140, 142, 146, and 148 for the applications other than the applications to be restricted to "red."

Further, the display unit 14 may be configured to make the size of each of the icons 140, 142, 146, and 148 for the applications other than the applications to be restricted larger than the icons 141, 143 to 145, 147, and 149 to 151 for the applications to be restricted.

Furthermore, the display unit 14 may be configured to change the display location of each of the icons 140, 142, 146, and 148 for the applications other than the applications to be restricted to a location above (or below) the display location of each of the icons 141, 143 to 145, 147, and 149 to 151 for the applications to be restricted.

Besides, the display unit 14 may be configured to display the restriction rate included in the SSAC information or the ACDC information.

Alternatively, the display unit 14 may be configured to change at least one of the color, size, shape, icon display mode, and display location of each of the icons for the applications to be restricted based on the restriction rate included in the SSAC information or the ACDC information, instead of directly displaying the restriction rate included in the SSAC information or the ACDC information.

Further, the display unit 14 may be configured to display, on the display 14A, information that prompts use of an application which can replace each of the applications to be restricted.

Alternatively, the display unit 14 may be configured to make a voice notice or a text notice of information that prompts use of an application which can replace each of the applications to be restricted.

Further, the display unit 14 may be configured to, if a change of the applications to be restricted is detected, make a notice of the change through voice or text.

The features of the present embodiment may also be expressed as follows.

A first feature of the present embodiment is summarized as a mobile station UE including: a storage unit 13 configured to store an application executable on the mobile station UE; a display unit 14 configured to display an icon for the application on a display 14A; and a determination unit 12 configured to determine an application to be restricted based on SSAC information or ACDC information (restriction information). Here, the display unit 14 is configured to change a display method of displaying the icon for the application executable on the mobile station UE on the display 14A based on a result of the determination on the application to be restricted.

According to the above feature, because the way of displaying icons for applications to be restricted differs from the way of displaying icons for applications other than the applications to be restricted, the user can know applications to be restricted when restriction processing on per application basis is being carried out.

In the first feature of the present embodiment, the display unit 14 may change at least one of color, size, shape, icon display mode, and display location of the icon for the application to be restricted.

According to the above feature, the user can know applications to be restricted easily based on the color, size, shape, icon display mode, and display location of each of icons of applications displayed on the display.

In the first feature of the present embodiment, the display unit 14 may change at least one of color, size, shape, icon display mode, and display location of the icon for an application other than the application to be restricted.

According to the above feature, the user can know applications to be restricted easily based on the color, size, shape, icon display mode, and display location of each of icons of applications displayed on the display.

In the first feature of the present embodiment, the display unit 14 may display a restriction rate included in the SSAC information or the ACDC information.

According to the above feature, the user can know the restriction rate of each application when restriction processing on per application basis is being carried out, and thereby can guess the executability of each application.

In the first feature of the present embodiment, the display unit 14 may change at least one of the color, size, shape, icon display mode, and display location of the icon for the application to be restricted based on a restriction rate included in the SSAC information or the ACDC information.

According to the above feature, the user can know the restriction rate of each application when restriction processing on per application basis is being carried out, and thereby can guess the executability of each application.

In the first feature of the present embodiment, if a change of the application to be restricted is detected, the display unit 14 may make a notice of the change through voice or text.

According to the above feature, the user can easily find the change of the applications to be restricted.

In the first feature of the present embodiment, the storage unit 13 may store an application which can replace the application, and the display unit 14 may display, on the display 14A, information that prompts use of the application which can replace the application to be restricted.

According to the above feature, even if the user cannot use an application to be restricted, he/she can easily know an application which can replace this application, so that he/she can use a desired service.

In the first feature of the present embodiment, the storage unit 13 may store an application which can replace each application, and the display unit 14 may make a notice, through voice or text, of information that prompts use of the application which can replace the application to be restricted.

According to the above feature, even if the user cannot use an application to be restricted, the user can easily know an application which can replace this application, so that the user can use a desired service.

It should be noted that the foregoing operations of the radio base station eNB and the mobile station UE may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the radio base station eNB and the mobile station UE. Otherwise, the storage medium and the processor may be provided as discrete components inside the radio base station eNB and the mobile station UE.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2013-007461 (filed on Jan. 18, 2013) is incorporated by reference in the present specification.

INDUSTRIAL APPLICABILITY

As has been described above, the present invention can provide a mobile station capable of easily informing a user of applications to be restricted when restriction processing on per application basis is being carried out.

EXPLANATION OF THE REFERENCE NUMERALS

UE mobile station
eNB radio base station
11 reception unit
12 determination unit
13 storage unit
14 display unit
14A display
140 to 151 icon

The invention claimed is:

1. A mobile station comprising:
a storage unit configured to store a plurality of applications executable on the mobile station;
a display unit configured to display an icon for at least one of the plurality of applications on a display; and
a determination unit configured to determine an application to be restricted based on ACDC (Access Control for general Data Connectivity) information, wherein
the display unit is configured to change a display method of displaying the icon for the application executable on the mobile station on the display based on a result of the determination on the application to be restricted,
wherein the storage unit stores the application to be restricted and an application other than the application to be restricted,
wherein the display unit changes at least one of color, size, shape, icon display mode, and, display location of the icon for the application to be restricted, and
wherein the display unit changes at least one of the color, size, shape, icon display mode, and display location of the icon for the application to be restricted based on a restriction rate included in the ACDC information.

2. The mobile station according to claim 1, wherein the display unit changes at least one of color, size, shape, icon display mode, and display location of the icon for the application other than the application to be restricted.

3. The mobile station according to claim 1, wherein the display unit displays a restriction rate included in the ACDC information.

4. The mobile station according to claim 1, wherein if a change of the application to be restricted is detected, the display unit makes a notice of the change through voice or text.

5. The mobile station according to claim 1, wherein
the storage unit stores an application which can replace the application, and
the display unit displays, on the display, information that prompts use of the application which can replace the application to be restricted.

6. The mobile station according to claim 1, wherein
the storage unit stores an application which can replace of the application to be restricted, and
the display unit makes a notice, through voice or text, of information that prompts use of the application which can replace of the application to be restricted.

* * * * *